O. C. SCHMIDT
MEASURING MACHINE
Filed Jan. 31, 1927
1,699,494
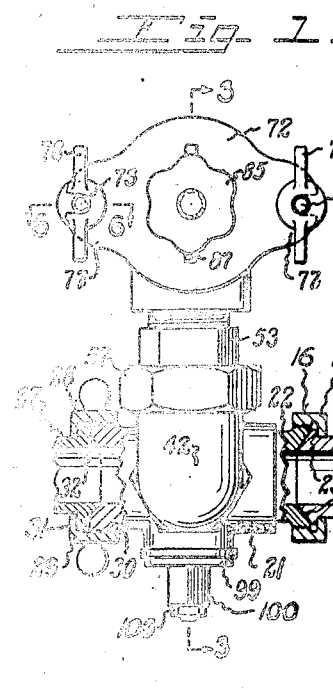
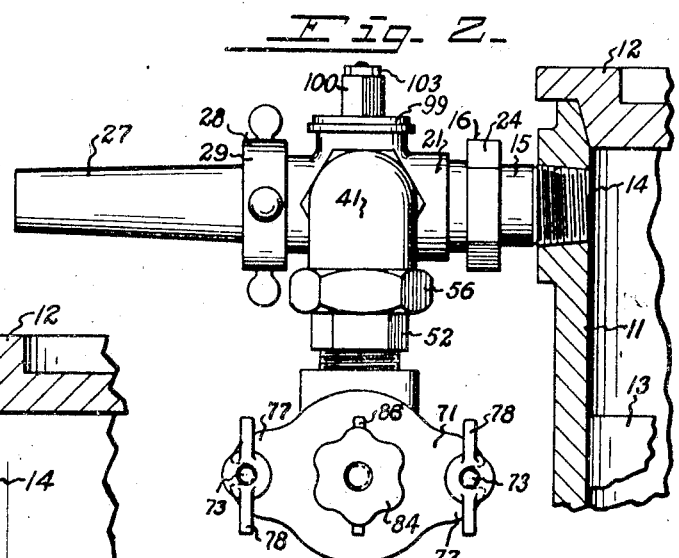
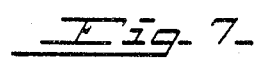
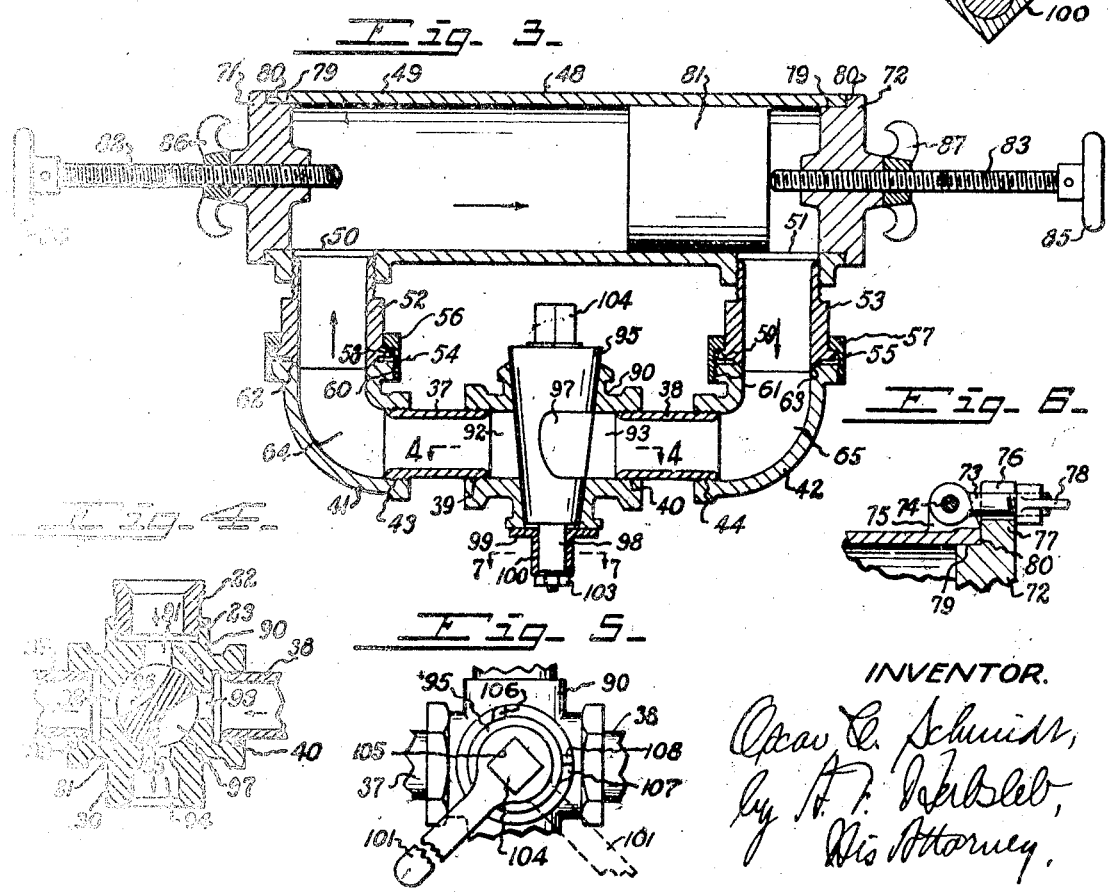
INVENTOR.
Oscar C. Schmidt,
by his Attorney Patented Jan. 15, 1929.

1,699,494

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

MEASURING MACHINE.

Application filed January 31, 1927. Serial No. 164,836.

My invention relates to measuring machines for measuring flowable material into predetermined quantities, and is applicable for dispensing said material, for filling containers with predetermined weights or quantities of the same, or disposing of the material in other manner. It is employable, for instance, in measuring lard, sausage meat or dough, and other materials in liquid or plastic state, that is, material which is readily flowable under pressure. I have exemplified my invention as used in connection with delivering sausage dough from a usual sausage stuffing machine.

It is the object of my invention to provide new and improved means for controlling the amount of material measured; further, to provide novel means for locating the device in reversed positions and for controlling the opening and closing of the valve mechanism in either of said positions; further, to provide a mechanism with interchangeable parts; and further to provide means for easy removal of the parts for cleaning the same.

The invention will be further readily understood from the following description and claims, and from the drawings, in which latter:

Fig. 1 is a side elevation of my improved device, partly broken away and partly in section, shown attached to a stuffing machine, partly broken away.

Fig. 2 is a similar view, with the measuring machine inverted.

Fig. 3 is a longitudinal section of my improved device, taken on the line 3—3 of Fig. 1.

Fig. 4 is a detail cross-section of the valve, taken in the plane of the line 4—4 of Fig. 3.

Fig. 5 is a plan view of the valve and connected parts, partly broken away, showing the handle at one limit of movement in full lines, and at its opposite limit of movement in dotted lines.

Fig. 6 is a detail view in section on the line 6—6 of Fig. 1; and,

Fig. 7 is a detail view in section taken in the plane of the line 7—7 of Fig. 3.

In mechanism of this character, the flowable material, which may for instance, be meat dough, is fed to the measuring machine by means of pressure.

I have instanced such pressure means to be a sausage stuffing machine of usual design, and as compromising a cylindrical tank 11, provided with a cover 12. The cover is suitably releasably secured in place in manner to prevent leakage between the cover and the tank. The meat dough is received in the cylinder above a piston 13. Pressure is applied below the piston for forcing the material upward and through a discharge opening 14, proximate the upper end of the tank.

A union tail piece 15 of a union coupling 16 is threaded into the discharge opening, which serves as the feeding opening of my improved device. A four-way valve 21 is connected with said union tail piece by said union coupling, the valve casing having a threaded socket piece 22 of said coupling threaded therein at 23, and a union ring 24 being threaded over the threaded outer end of said socket piece and coacting with the annular flange 25 of the tail piece for securely seating the joint 26 in said coupling and providing for ready and quick release of my improved device, and reuniting the same with the material feeding means, and providing ready means for disposing my improved device in up position or in down position.

The valve is at its other side provided with a delivery pipe 27, shown as a nozzle, connected with the valve casing by a union coupling 28, comprising a union ring 29 having threaded connection with the threaded lug 30 of the valve casing, and coacting with the annular flange 31 of the nozzle, for firmly connecting the joint 32 in said union coupling.

Secured to the valve casing at right angles to the aforementioned connections are nipples 37, 38, respectively threaded to the valve casing at 39, 40. Elbow joints 41, 42, are secured to these nipples by threaded connections 43, 44. The valve, the nipples and the elbows just described form a combined valve structure, which is readily applied to and removed from the floating piston mechanism to be presently described.

A cylinder 48 comprises a shell 49. The cylinder is at its respective ends provided with ports 50, 51. Union tail pieces 52, 53, are threaded to the walls of said respective ports, these tail pieces being parts of union couplings 54, 55, connecting the cylinder with the assembled valve structure for readily and quickly connecting said valve structure with said cylinder and removing said valve structure from said cylinder, for quickness and convenience in cleaning the device.

The respective union couplings comprise union rings 56, 57, respectively coacting with annular flanges 58, 59, on the respective union tail pieces 52, 53, and are threaded to the threaded ends 60, 61, of said coupling structure for firm connection in the joints 62, 63, in said couplings. Passages 64, 65, are thus formed between the valve and the respective ends of the cylinder.

The shell 49 is provided with a bore. Heads 71, 72, are secured to the respective ends of the shell by means of bolts 73, pivoted on pins 74 received in lugs 75 extending from the shell. The bolts are received in slots 76 in lugs 77 of the heads. Wing-nuts 78 are received over the threaded ends of the bolts for clamping the heads to the shell. The heads are provided with rabbets 79 forming shoulders 80 which bear against the ends of the cylinder.

A piston 81 is located in the bore of the cylinder, and has a sliding fit with said cylinder. This piston is a floating piston and is moved by the pressure of the flowable material being measured. Screw rods 82, 83, are threaded into the heads of the shell. The ends of the rods form limiting stops for the piston. Handwheels 84, 85, are fixed to the screw rods for manipulation of the same. The rods are locked in adjusted positions by wing-nuts 86, 87.

The valve-casing 90 has ports 91, 92, 93 and 94 connecting respectively with the feeding passage in the union coupling 16, the passages 64, 65, and the discharge passage in the nozzle 27.

The valve-casing is provided with a taper plug 95, provided with port connecting recesses 96, 97, for connecting any two adjacent ports in the valve casing. The plug 95 has a reduced end 98 over which a washer 99 having an extension 100 is received. The extension 100 is arranged to receive a handle 101. The reduced end of the plug is provided with a flat face 102 complemental to a flat face in the bore of the washer to maintain said parts in relatively non-rotative relation. A nut 103 draws the plug into its seat in the valve casing for proper seating of the plug.

The larger end of the plug 95 is provided with an extension 104 for the handle. The handle is provided with a socket 105, complemental with either of the extensions 100, 104, for operating the valve from either end of its valve stem. The valve handle and extensions are shown as having complemental faces which are square in cross-section.

The valve-casing is provided with lugs 106, 107. A pin 108 projects from the plug 95. The plug and pin can be moved in an arc equal to a right angle to permit setting up of different valve connections in the valve. The lugs limit the movements imparted to the plug for proper connection of the ports.

The screw rods 82, 83, are adjusted to permit the piston 81 to move an adjusted and fixed distance in the cylinder for measuring the amount of material to be fed from the nozzle upon each stroke of the piston. When the valve stem is in the position shown in Figs. 3 and 4, the material in the stuffing machine is forced through the passage in the union tail piece 15, thence through the passage 91 in the valve casing, the recess 96 in the valve plug, and the passages 92 and 64, into the cylinder.

The material which is under pressure, is forced through these passages into the cylinder, forcing the piston toward the other end of the cylinder. The material which had previously been forced into such other end of the cylinder is thereby forced through the passage 65, the port 93, the recess 97, the port 94, and out through the passage in the nozzle 27.

When the piston has completed its feeding stroke in the direction named, the handle 101 is turned until the pin 108 strikes the opposite lug, thus causing the recess 97 to connect the ports 91 and 93. The recess 96 will simultaneously connect the ports 92 and 94. This position of the valve causes reverse movement of the flowable material in the cylinder, and discharge from the cylinder of the material previously fed into the cylinder.

By the adjusting the screw rods, controlling the limits of movements of the piston, the exact desired amount of material in volume and weight, will be discharged from the nozzle, at each limit movement of the valve plug.

The parts are arranged and connected for easy separation. In machines of this character it is essential that the parts be thoroughly cleaned each time the mechanism is used, and the parts of my improved device are so constructed and arranged as to be readily taken apart, cleaned and reassembled. New parts may also be readily substituted for parts which may be defective or worn. The parts are simple and are strong and durable.

I have so constructed my improved device that the piston mechanism may be mounted above the valve mechanism, as shown in Figs. 1 and 3, or below the valve mechanism, as shown in Fig. 2. It is desirable that the valve operating handle shall be located on what may at the time be the upper end of the valve stem. The handle in practice moves through an arc of substantially only 90 degrees between its limits of movements for causing flow in one direction or the other direction in the cylinder and in the passages and conduits between the feeding opening and the cylinder and between the cylinder and the discharge opening or nozzle, and the reverse movements of the handle are quickly accomplished by the operator, so that the feeding impulses imparted to the flowable material are substantially continuous with only sufficient interruption to permit the dropping, wiping or other removal of the measured quantities of flowable material discharged or exuded at each impulse of my improved device.

When the device is operated with its piston mechanism in down position, the contracted end of the valve stem will, in the present exemplification, be in up-position. The handle will then be received over the extension 100 of the washer 99.

Having thus fully described my invention, what I claim as new, and desire to secure by Letters Patent, is:

1. In a measuring machine, the combination of a piston-cylinder, a valve connecting with the respective ends of said cylinder, said cylinder located at one side of said valve, said valve comprising an upright valve-plug provided with handle receiving means at each of its ends, and shiftable means for attaching said valve to a pressure device selectively with said cylinder above said valve and with said cylinder below said valve for location of said respective handle receiving ends of said valve-plug in upward operative positions for reception of the handle in operative relation with the upper one of said handle receiving ends.

2. In a measuring machine of the character described, the combination of a piston cylinder, a valve located at one side of said cylinder and connecting with the respective ends of said cylinder, said valve comprising a rotatable valve-plug whose axis of rotation if extended substantially intersects the axis of said cylinder, said valve-plug provided with handle-receiving means at its end between said valve-casing and said cylinder and with handle-receiving means at its end which is at the side of said valve opposite said cylinder and arranged whereby one of said handle-receiving means is in uppermost position, means for attaching said valve to a pressure device with said valve or said cylinder selectively in uppermost position, and a valve-plug operating handle having releasable attachment with said handle-receiving end of said valve-plug which is uppermost 3. In a measuring machine of the character described, the combination of a piston cylinder, a valve at one side of said cylinder and connecting with the respective ends of said cylinder, said valve comprising a rotatable frusto-conical valve-plug whose axis of rotation if extended substantially intersects the axis of said cylinder, said valve-plug provided with handle-receiving means at its end of greatest diameter and with handle-receiving means at its end of least diameter, one of said handle-receiving means located between said valve-casing and said cylinder, and one of said handle-receiving means presented upwardly and the other of said handle-receiving means presented downwardly, means for attaching said valve to a pressure device with said valve or said cylinder selectively in uppermost position, and a valve-plug operating handle having releasable attachment with said handle-receiving means which is presented upwardly.

In testimony whereof, I have hereunto signed my name.

OSCAR C. SCHMIDT.